July 5, 1949.　　　C. J. EVANS　　　2,475,227

MILLING MACHINE

Filed Oct. 9, 1946

INVENTOR.
CLARENCE J. EVANS
BY
Kwis, Hudson, Boughton & Williams
ATTORNEYS

Patented July 5, 1949

2,475,227

UNITED STATES PATENT OFFICE 2,475,227

MILLING MACHINE

Clarence J. Evans, Cleveland, Ohio

Application October 9, 1946, Serial No. 702,332

4 Claims. (Cl. 90—15)

This invention relates to milling machines and, more particularly, to an improved and simplified form of milling apparatus.

An object of the invention is to provide a novel and improved milling machine of extremely simple and inexpensive construction for performing various light duty milling operations including that of cutting keyways and other longitudinal grooves in workpieces.

Another object of the invention is to provide a novel and improved milling machine comprising a body member, in which a rotatable shaft and milling cutter are journaled with the axis of the cutter extending transversely of the axis of the shaft, the shaft carrying means directly cooperating with the cutter to rotate the latter.

A further object of the invention is the provision of a novel and improved milling machine comprising a body member in which a rotatable shaft and a toothed milling cutter are rotatably journaled, the shaft being provided with means cooperating with the teeth of the cutter to rotate the latter.

A still further object of the invention is the provision of a novel milling attachment for use with a machine tool having a rotatable spindle, the attachment comprising a body member in which a shaft and a milling cutter are journaled for rotation, the shaft being adapted to be connected with the spindle of the machine tool to be supported and rotated thereby to drive the milling cutter, and the body member being provided with means to prevent it from rotating.

An additional object of the invention is to provide a novel milling attachment for a drill press or the like having a rotatable spindle, the attachment comprising a body member in which a shaft and milling cutter are journaled for rotation with the axis of the cutter extending transversely of the axis of the shaft, the shaft being adapted to be supported and rotated by the spindle of the drill press and having means directly cooperating with the cutter to rotate the latter, and the body member being provided with means to prevent rotation of the latter when the shaft is rotated.

It is also an object of the invention to provide a novel milling attachment of the type described in the preceding object and further characterized by the milling cutter being toothed, and the means for rotating the cutter comprising means carried by the shaft and acting upon the teeth of the cutter.

Another object of the invention is to provide a novel milling attachment for a drill press or other machine tool having a rotatable spindle, the attachment being of the type described in the two preceding objects and the body member thereof being provided with detachable means for cooperation with a previously milled groove or keyway in a workpiece or an adapter to locate and guide the cutter in predetermined angular relationship thereto.

A still further object of the invention is to provide a novel attachment adapted to be supported and operated by the spindle of a machine tool, the attachment comprising a body member in which a shaft and a milling cutter are journaled, the shaft being adapted to be connected with the spindle of the machine tool to be rotated thereby and having means thereon to drive the milling cutter, and the body member being provided with a removable bushing means surrounding a portion of the lower end of the body member with the bushing means having an external configuration substantially corresponding to the configuration of an opening in a workpiece to be milled.

It is also an object of the invention to provide an adapter or bushing for use with a milling attachment which is adapted to be inserted into an opening in a workpiece to mill a longitudinally extending groove therein, the adapter having an external configuration substantially corresponding to the opening in the workpiece and having a longitudinally extending opening in which a portion of the milling attachment has a sliding fit, the opening for receiving the milling attachment extending through a portion of the side wall of the adapter to allow the milling tool carried by the attachment to engage the workpiece.

The invention further resides in certain novel features, details of construction and combinations and arrangements of parts; and further objects and advantages thereof will become apparent to those skilled in the art to which it pertains from the following description of certain embodiments thereof described with reference to the accompanying drawing in which similar reference numerals represent corresponding parts throughout the several views and in which.

Figures 1, 2, 3, 4, 5, 6, 7, 8, 9:
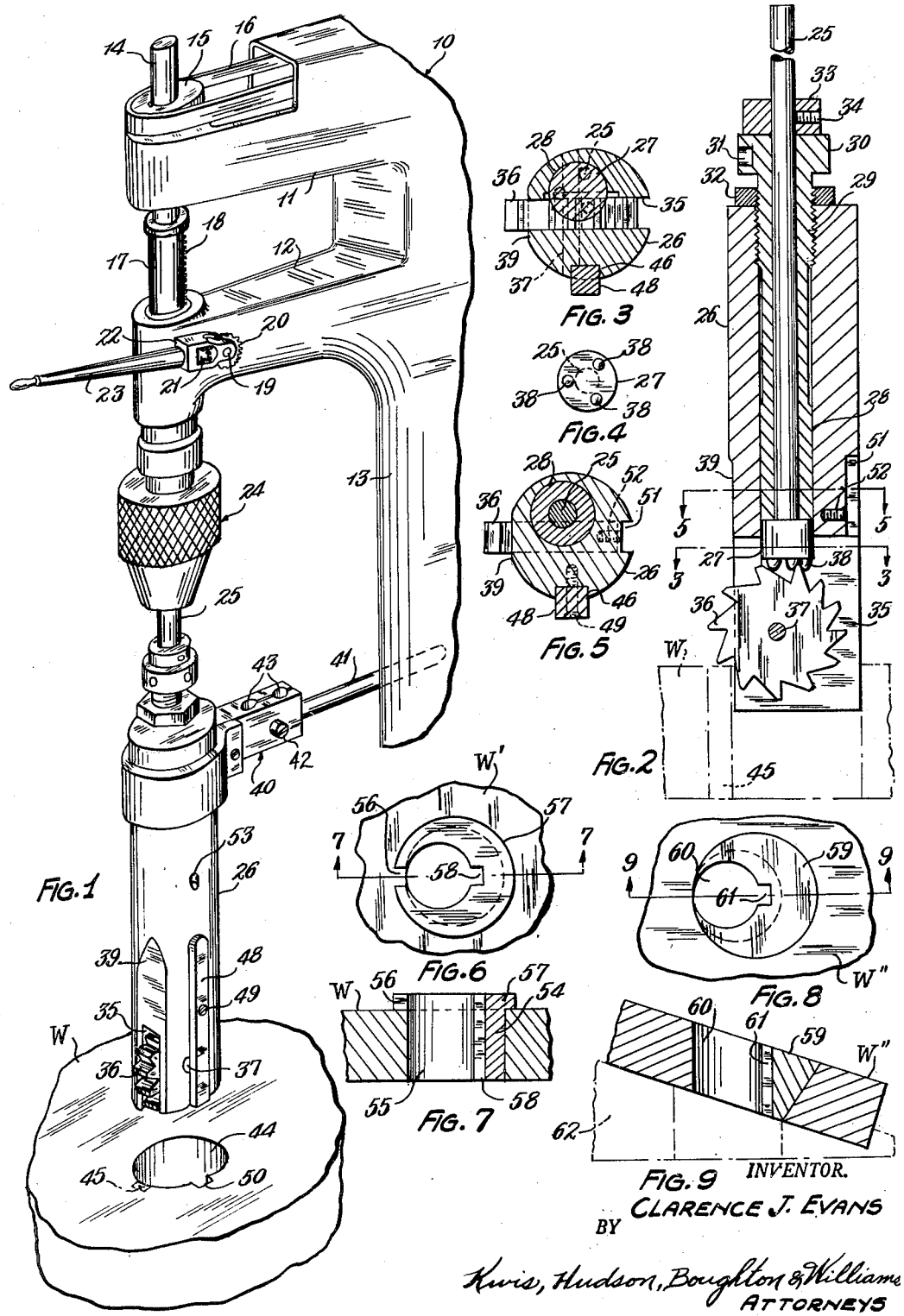
Fig. 1 is a fragmentary perspective view of the novel and improved milling machine of this invention with a portion of a workpiece illustrated therebelow.
Fig. 2 is a longitudinal sectional view through the novel milling attachment per se with certain parts shown in elevation and with a portion of a workpiece, which is to be milled, shown in dot-dash lines.
Fig. 3 is a sectional view through the novel milling attachment taken on the line 3—3 of Fig. 2 and looking in the direction indicated by the arrows.
Fig. 4 is a bottom elevational view of the shaft of the improved milling attachment showing the means thereon for effecting rotation of the cutter.
Fig. 5 is a sectional view taken substantially on the line 5—5 of Fig. 2 and looking in the direction indicated by the arrows.
Fig. 6 is a top elevational view of a portion of a workpiece provided with a novel adapter or bushing which is employed with the milling attachment when the opening in the workpiece to be milled is larger than the body of the milling attachment.
Fig. 7 is a sectional view taken substantially on the line 7—7 of Fig. 6 and looking in the direction indicated by the arrows.

Fig. 8 is a top elevational view of a portion of a workpiece having a tapered opening and provided with a modified form of adapter or bushing which is employed therewith when the novel milling attachment is to be employed to cut a groove in the side of tapered opening; and, Fig. 9 is a sectional view taken on the line 9—9 of Fig. 8, looking in the direction indicated by the arrows, and also showing, in dot-dash lines, a jig employed with the workpiece and bushing of Fig. 8.

As shown in Fig. 1 of the drawings, one embodiment of a milling machine constructed in accordance with the invention comprises an upright frame, generally designated 10, having a pair of spaced, forwardly extending arms or brackets 11 and 12 and a vertically extending member 13, only a portion of the latter being here illustrated, the remainder thereof and the base of the machine being broken away. It will be understood, however, that the base of the machine may be a pedestal or other known type of support and provided with a work table, upon which is a workpiece such as W may be placed for effecting a milling operation thereon. The brackets or arms 11 and 12 of the frame 10 are provided with vertically aligned openings in which a spindle 14 is mounted for rotation and reciprocation. Rotation of the spindle 14 can be effected by means of a pulley 15, which is slidably keyed to the spindle and is driven by a belt or similar driving means 16 extending through an opening in the upper bracket member 11 of the frame and trained about the pulley on a motor or other driving means not shown.

The spindle 14 extends through an axially movable sleeve 17, the spindle being journaled in the sleeve and supported for axial movement therewith. The sleeve 17 extends through the opening in the bracket 12 and cooperates therewith, as by means of a key or similar expedient, for axial movement therein without rotation. For the purpose of reciprocating the sleeve and the spindle, the former is provided with rack teeth 18 cooperating with a pinion, not shown, which is supported and rotated by a shaft 19 journaled in the bracket 12. The outer end of the shaft 19 is provided with a pinion 20 which meshes with a toothed sector 21 carried by the bifurcated end 22 of a handle 23, the bifurcated member 22 straddling the pinion 20 and being rotatably supported upon the shaft 19. It will be apparent that when the handle 23 is rocked about the shaft 19, the sector 21 carried thereby will rotate the pinion 20 and shaft 19 thereby axially moving the sleeve 17 and the spindle 14.

The lower end of the spindle 14, below the bracket 12, is provided with a suitable chuck, generally designated 24, which may be of any conventional type for gripping and rotating a cylindrical shaft or the like. As shown in Fig. 1, a shaft 25 is positioned in the chuck and is supported and rotated thereby. The shaft 25 is rotatably journaled in a longitudinally extending bore provided in a carrier or body member 26 and eccentrically disposed with respect to the axis of the latter. As will be seen from Fig. 2, the inner or lower end of the shaft is provided with an enlarged portion 27, which may be formed integrally therewith or secured thereto. The reduced portion of the shaft 25 above the enlarged portion 27 is rotatably received in a sleeve member 28 provided with a threaded section 29 adjacent its upper end cooperating with a corresponding threaded portion of the bore in the body member 26. The outer end of the sleeve 28 is formed as an enlarged boss or collar 30 which may be provided with a plurality of openings, such as 31, for receiving a spanner wrench or other tool for threading the sleeve into the carrier or body member to thereby adjust the position of the enlarged portion 27 of shaft 25 for a purpose which will hereinafter become apparent. A lock nut 32 is provided upon the threaded portion 29 of the sleeve for cooperation of the body member 26 to lock the sleeve when the latter has been threaded within the bore of the body member to position the enlarged portion 27 of the shaft at a desired point. A collar 33 provided with a set screw 34 is fitted over the upper end of the shaft 25 to retain the latter against axial movement relative to the sleeve 28.

The carrier or body member 26 is preferably substantially cylindrical, and its lower end is axially slotted, as at 35, for receiving a toothed milling cutter 36, the latter being rotatably journaled within the slot of the body member by a short shaft 37. It will be noted that the axis of the shaft 37 is located to one side of the center of the body member 26 so that the teeth of the milling cutter 36 project exteriorly of the body member on only one side thereof. As will be seen from Fig. 2, the enlarged portion 27 on the shaft 25 terminates closely adjacent the teeth of the milling cutter 36, and the lower face of the portion 27 is provided with a plurality of spaced nibs of the projections 38 adapted to cooperate with the teeth of the milling cutter in the nature of a pinion, the proper location of the nibs 38 for this purpose being effected by the previously described adjustment of sleeve 28. Hence, when the shaft 25 is rotated, the projections 38 will cause the milling cutter 36 to rotate. While projecting nibs cooperating with the teeth of the cutter have been shown as a means for effecting a drive between the shaft 25 and the milling cutter 36, it will be readily apparent that other means may be employed for effecting this drive.

The outer face of the body member 26 is provided with a flat surface 39, aligned with the projecting portion of the toothed cutter 36, to accommodate chips formed during operation of the cutter. The body member 26 is also provided with means cooperating with the frame 10 to prevent rotation of the body member when the shaft 25 is rotated by the spindle 14. In the present instance this means is shown as comprising a clamp member 40 secured to the upper end of the body member and extending radially therefrom. The outer end of the clamp member is split and provided with an opening for receiving a removable extension rod 41 adapted to abut a portion of the vertical member 13 of the frame. The rod 41 is held in place in the clamp 40 by a clamping screw 42 which draws the two sections of the split portion of clamp together, thus firmly gripping rod 41. The rod 41 may be removed and positioned in either of a pair of vertical openings 43 in the split portion of the clamp member if it be desired that the rod cooperate with a horizontal projection, such as the bracket 12 of the frame, rather than with the vertical member 13.

The apparatus thus far described is employed as follows. Assuming that a workpiece W has an opening 44 therein which it is desired to provide with a keyway or longitudinally extending groove and that this workpiece has been supported directly below the body member 26 with the opening 44 in alignment therewith. The spindle 14, being rotated by the belt 16, will rotate the shaft 25, and the ribs or projections 38 on the lower end of the latter cooperate with the teeth of the cutter 36 to rotate the latter. The operator then rocks the handle 23 thus lowering the sleeve 17, spindle 14, shaft 25, and body member 26 to cause the latter to enter the opening 44 in the workpiece. As the operator continues to move the handle 23, the cutter 36 will engage the workpiece and mill a groove or keyway 45 therein, the chips from this cutting or milling operation being accommodated in the space provided by the flattened surface 39 on the body member 26. When the groove or keyway has been completed, the operator will rock the handle 23 in the reverse direction, thereby elevating the mechanism to remove the body member 26 and the milling cutter from engagement with the work.

The body member 26 may be provided with a longitudinally extending recess 46 (see Figs. 3 and 5) in the outer surface thereof at substantially 90° about the periphery of the body member from the slotted opening 35 in which the cutter is positioned. This recess 46 is adapted to receive a longitudinally extending projection or key 48, which may be secured to the body member by suitable means such as a screw 49. This projection or key is adapted to be used with a workpiece having a keyway or groove previously formed therein when it is desired to form a second keyway or groove in the same workpiece but angularly displaced substantially 90° from the first keyway. For example, if the workpiece W, as shown in Fig. 1, be provided with a previously formed keyway, such as 50, a second keyway, such as 45, may be formed at substantially 90° from the keyway 50 by attaching the key or projection 48 to the body member 26 and employing the said key in conjunction with the keyway 50 to locate and guide the body member 26 during the milling of the keyway or groove 45.

The exterior of the body member 26 may also be provided with a second longitudinally extending recess 51 which is aligned with, and extends upwardly from, the portion of the slotted opening 35 at the rear of the milling cutter, and within the recess 51 body member 26 may be provided with a threaded opening 52. This recess 51 and threaded opening 52 enable the key or projection 48 to be attached to the body member at the rear of the cutter 36 when it is desired to form a second keyway in a workpiece at substantially 180° from a previously formed keyway or groove. Hence, by employing the milling machine here described first without the key or projection 48 and then with the said projection or key attached to the body member, a plurality of keyways or longitudinally extending grooves may be formed in a workpiece in predetermined angular relationship with respect to each other. While the projection or key 48 has been shown as attachable to the body member 26 in positions displaced 90° or 180° with respect to the cutter, it will be apparent that these angles are not critical and the body member may be provided with suitable recesses and threaded openings in other angular relation with respect to the position of the milling cutter if desired. Moreover, the projection or key may be secured to the body member by other means. The body member 26 may also be provided with one or more oil holes 53 or other means for lubrication of the shaft 25.

While the milling machine of this invention has heretofore been described as a complete machine including a driving means for rotating the milling cutter and for feeding the latter relative to the workpiece, it will be apparent that the invention further resides in a milling attachment per se which may be employed with a conventional machine tool having a rotatable spindle, means for connecting a shaft thereto and a means for producing a relative feeding movement between the spindle and a workpiece. More specifically, this invention contemplates that a drill press or similar machine tool may be converted into a milling machine by employing therewith, as an attachment, the novel milling device, which is illustrated per se in Fig. 2. As a matter of fact, the apparatus illustrated in Fig. 1 may be a conventional drill press with the shaft 25 supported and rotated by the chuck thereof, the projection rod 41 cooperating with a portion of the frame of the drill press to prevent rotation of the body member 26 when the shaft 25 of the milling attachment is rotated. Hence, by the provision of such an attachment, any machine shop can be readily equipped to perform light duty milling operations and to mill keyways or similar grooves in workpieces without the necessity of providing a cumbersome and expensive special machine.

Referring now to Figs. 6 and 7, there is shown therein an adapter or bushing for use with the milling machine or attachment previously described when the workpiece in which the longitudinal groove is to be formed has an opening larger than, or differing in configuration from, the outer periphery of the lower end of the body member 26. The specific adapter or bushing 54 illustrated in Figs. 6 and 7 is adapted for use in a cylindrical opening of a workpiece W' and the said bushing or adapter 54 therefore has a cylindrical configuration with a diameter substantially equal to the diameter of the opening in the workpiece W'. The bushing or adapter 54 is provided with a longitudinally extending bore 55, eccentrically disposed with respect to the axis of the adapter, and having a diameter for slidingly receiving the body member 26 of the milling machine or attachment. A longitudinally extending slot or opening 56 in the side wall of the adapter 54 communicates with the bore 55 and affords an opening through which the teeth of the milling cutter 36 may project for engagement with the workpiece. The upper end of the adapter or bushing 54 is preferably provided with an enlarged collar 57 for cooperation with the top surface of the workpiece W' to retain the bushing therein. If desired, the bore 55 of the adapter may be provided with a longitudinally extending keyway 58 for reception of the key 48 on the body member 26 to guide and locate the latter when the adapter or bushing is employed. The operation of the milling machine or attachment, when using such an adapter, is otherwise the same as previously described and hence the description will not be repeated.

If the workpiece, such as W", has a tapered opening therein which is to be provided with a keyway or similar longitudinally extending groove, an adapter or bushing similar to that shown in Figs. 8 and 9 may be employed with the milling machine or attachment. It will be noted that the bushing or adapter 59, in such a case is substantially frusto-conical in shape and has an inclined eccentrically disposed opening 60 therein in which the body member 26 of the milling attachment may be slidingly received. The axis of the opening 60 has an angle of inclination substantially equal to the angle between the side wall of the adapter and its base and a portion of the inclined opening 60 intersects a portion of the side wall of the adapter to provide an opening through which the milling cutter 36 may project into engagement with the workpiece W". The opening or bore 60 in the adapter 59 may be provided with a keyway, such as 61, for receiving a key 48 attached to the body member 26 to locate and guide the latter as it is moved within the adapter during a milling operation.

Since the milling machine or attachment, as here disclosed, is intended to be fed relative to the work in a vertical direction, and since the opening in the workpiece W" is inclined to the vertical, it is necessary to support the said workpiece W" upon a suitable sloping supporting surface of a jig 62 or the like, whose slope is such as to dispose the opening 60 in the adapter 59 with its axis extending vertically. Hence, when the body member 26 of the milling machine or attachment is inserted within the opening 60, it may move freely therethrough in a vertical direction, and the teeth of the cutter 36 will extend through the opening in the side of the adapter 59 to mill a keyway or groove in the side wall of the inclined opening of the workpiece W".

While only certain types of adapters or bushings have here been disclosed, it will be readily apparent that the improved milling machine or attachment is not limited to use with the specific bushings or adapters disclosed but may be employed with any adapter having an opening in which the body member 26 of the milling machine may slide, and through the side of which the milling cutters 36 may project into engagement with the workpiece, the bushing or adapter having an external configuration substantially corresponding to the configuration of the opening in a workpiece in which the milling operation is to be performed.

While the present preferred embodiment of the novel and improved milling machine and its use as an attachment in a drill press or the like have been disclosed in considerable detail, and while certain specific forms of bushings or adapters have been disclosed for use with the improved milling machine or attachment, it will, of course, be understood that numerous changes and modifications may be made in the milling machine or the bushings for use therein; and hence, the invention is not to be considered as limited to the exact constructions illustrated and described but includes all modifications and equivalents coming within the spirit and scope of the appended claims.

Having thus described my invention, I claim:

1. A milling attachment adapted to be supported and operated by a rotatable spindle of a machine tool, the attachment comprising a cylindrical body member having a longitudinally extending bore therein and a radially extending slotted opening communicating with said bore, a shaft rotatably journaled in said bore and having a portion extending exteriorly thereof for connection with the spindle of the machine tool, means to prevent axial displacement of the shaft relative to the body member, a milling cutter rotatably mounted in the said slotted opening with a portion of the cutter extending exteriorly of the body member, means carried by said shaft for rotating the cutter, the lower end of said body member being adapted to be inserted into a bore in a workpiece to mill a longitudinally extending groove therein, and means on said body member angularly disposed thereabout with respect to the exteriorly extending portion of said cutter for locating and securing a longitudinally extending projection to the body member for cooperation with a groove milled in said workpiece, or with a keyway in an adapter cooperating with said attachment and workpiece, to locate and guide the cutter in predetermined angular relationship thereto.

2. A milling attachment adapted to be supported and operated by a rotatable spindle of a machine tool, the attachment comprising a cylindrical body having a longitudinally extending bore therein, a shaft rotatably journalled in said bore and having a portion extending exteriorly thereof for connection with the spindle of the machine tool, means to prevent axial displacement of said shaft relative to the body member, a milling cutter rotatably mounted in a slotted opening extending axially of said body member with a portion of the cutter extending exteriorly of the body member, means carried by said shaft for engaging and rotating said cutter, the lower end of the cylindrical body member being adapted to be inserted into an opening in the workpiece for milling a longitudinally extending groove therein when said cutter is rotated, means to prevent rotation of said body member when the shaft and cutter are rotated, and a longitudinally extending key detachably secured to said body member at a location angularly disposed about the periphery of said body member from said exteriorly extending portion of the cutter, the said key cooperating with a previously formed longitudinally extending groove in an opening of the workpiece into which the body member is inserted for locating and guiding the latter and hence the cutter so that the latter is adapted to mill a second longitudinally extending groove in predetermined angular relationship to said first groove.

3. A milling attachment adapted to be supported and operated by a rotatable spindle of a machine tool, the attachment comprising a substantially cylindrical body member having an axially extending slot adjacent one end, a toothed cutter rotatably journalled in said slot with a portion of the cutter extending outwardly of the slot to perform a milling operation on a workpiece, the said body member having a longitudinal bore extending therethrough with the lower end of said bore communicating with the said slot, a sleeve having a portion extending into said bore, a shaft rotatably journalled in said sleeve and having an integral enlarged portion at its inner end engaging the corresponding end of said sleeve, a collar secured to said shaft and cooperating with the outer end of said sleeve, a group of axially extending projections carried by the said enlarged portion of the shaft and drivingly cooperating with the teeth of said cutter, the said shaft being adapted to be connected with the spindle of a machine tool to be supported and rotated thereby, means to prevent rotation of said body member, and means to adjust the said sleeve longitudinally within said bore thereby adjusting the said shaft and its axially extending projections relative to the cutter whereby the said projections on the shaft may be brought into proper cooperative engagement with cutters of different diameters.

4. A milling attachment adapted to be supported and operated by a rotatable spindle of a machine tool, the attachment comprising a substantially cylindrical body member having an axially extending slot adjacent one end, a toothed cutter rotatably journalled in the said slot with a portion of the cutter extending outwardly of the slot to perform a milling operation on a workpiece, the said body member having a bore extending longitudinally eccentrically through the body member with the lower end of said bore communicating with the slot, a portion of said bore being provided with a screw thread, a sleeve having a portion extending into said bore and provided with an external screw thread cooperating with the thread in said bore, a shaft rotatably journalled in said sleeve and having an integral enlarged portion at its inner end engaging the corresponding end of said sleeve, a collar secured to said shaft and cooperating with the outer end of said sleeve, the outer end of said shaft being adapted to be connected with the spindle of the machine tool to be supported and rotated thereby, means to prevent rotation of said body member, a group of axially extending projections carried by the said enlarged portion of the shaft and drivingly cooperating with the teeth of said cutter, the said cooperating threads on the sleeve and in the said bore permitting longitudinal adjustment of the sleeve and shaft relative to the cutter whereby the said projections on the shaft may be brought into proper cooperative engagement with cutters of different diameters.

CLARENCE J. EVANS.

REFERENCES CITED

The following references are of record in the file of this patent:

UNITED STATES PATENTS

| Number | Name | Date |
|---|---|---|
| 795,420 | Schellenbach | July 25, 1905 |
| 824,322 | Wilner et al. | June 26, 1906 |

FOREIGN PATENTS

| Number | Country | Date |
|---|---|---|
| 376,756 | Germany | June 4, 1923 |